US008944548B2

(12) United States Patent
Chen et al.

(10) Patent No.: US 8,944,548 B2
(45) Date of Patent: Feb. 3, 2015

(54) PRINTHEAD COLOR DENSITY CORRECTION IN PRINTING SYSTEMS

(71) Applicants: Samuel Chen, Penfield, NY (US); Mark C. Rzadca, Fairport, NY (US); Eric K. Zeise, Pittsford, NY (US); John T. Keech, Penfield, NY (US); Michael J. Piatt, Dayton, OH (US)

(72) Inventors: Samuel Chen, Penfield, NY (US); Mark C. Rzadca, Fairport, NY (US); Eric K. Zeise, Pittsford, NY (US); John T. Keech, Penfield, NY (US); Michael J. Piatt, Dayton, OH (US)

(73) Assignee: Eastman Kodak Company, Rochester, NY (US)

( * ) Notice: Subject to any disclaimer, the term of this patent is extended or adjusted under 35 U.S.C. 154(b) by 127 days.

(21) Appl. No.: 13/747,573

(22) Filed: Jan. 23, 2013

(65) Prior Publication Data

US 2014/0204147 A1 Jul. 24, 2014

(51) Int. Cl.
*B41J 29/393* (2006.01)
*B41J 2/21* (2006.01)

(52) U.S. Cl.
CPC .............. *B41J 29/393* (2013.01); *B41J 2/2146* (2013.01); *B41J 2/2132* (2013.01)
USPC ................................................ 347/9; 347/19

(58) Field of Classification Search
USPC ........................................ 347/5, 9, 12, 13, 19
See application file for complete search history.

(56) References Cited

U.S. PATENT DOCUMENTS

| 4,901,162 | A  * | 2/1990  | Kawai et al. ................... 358/468 |
| 7,537,304 | B2   | 5/2009  | Wu et al. |
| 7,571,974 | B2   | 8/2009  | Cowan et al. |
| 8,317,293 | B2   | 11/2012 | Lill et al. |
| 2004/0120014 | A1* | 6/2004 | Nakajima et al. ............. 358/3.26 |
| 2009/0244165 | A1* | 10/2009 | Saita ............................... 347/19 |
| 2010/0290093 | A1* | 11/2010 | Ito ................................. 358/461 |
| 2011/0061216 | A1* | 3/2011 | Yamada et al. ............... 29/25.35 |
| 2011/0075162 | A1* | 3/2011 | Saettel et al. ................... 358/1.9 |
| 2012/0075366 | A1* | 3/2012 | Kanome et al. .................... 347/8 |

* cited by examiner

*Primary Examiner* — Huan Tran
(74) *Attorney, Agent, or Firm* — William R. Zimmerli

(57) ABSTRACT

A printing system includes a linehead that jets ink onto a moving print media to print a test block and an integrated imaging system positioned downstream of the linehead with respect to a media transport direction. The integrated imaging system includes an opening in a housing for receiving light reflected from a moving print media. A folded optical assembly in the housing receives the reflected light and transmits the light a distance. One or more image sensors, having known color filter arrays, within the housing each receive the light and capture one or more images of the printed test block. An image processing device is connected to the integrated imaging system for receiving pixel data from the one or more image sensors and configured to determine a color of the ink and a density of the printed test block using the pixel data.

10 Claims, 10 Drawing Sheets

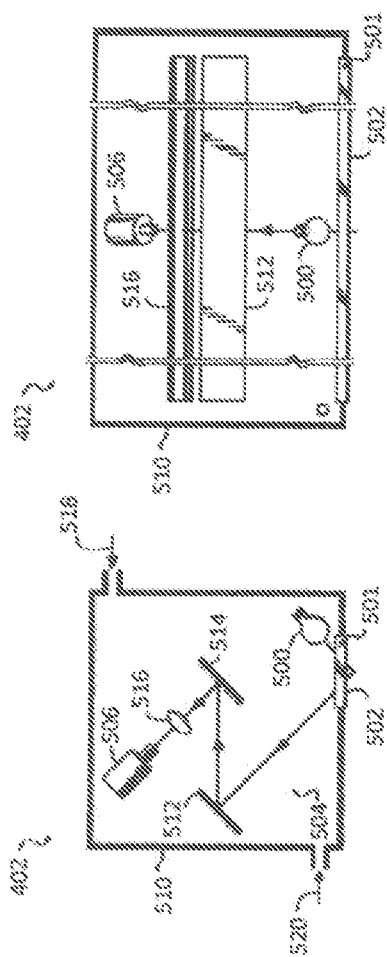

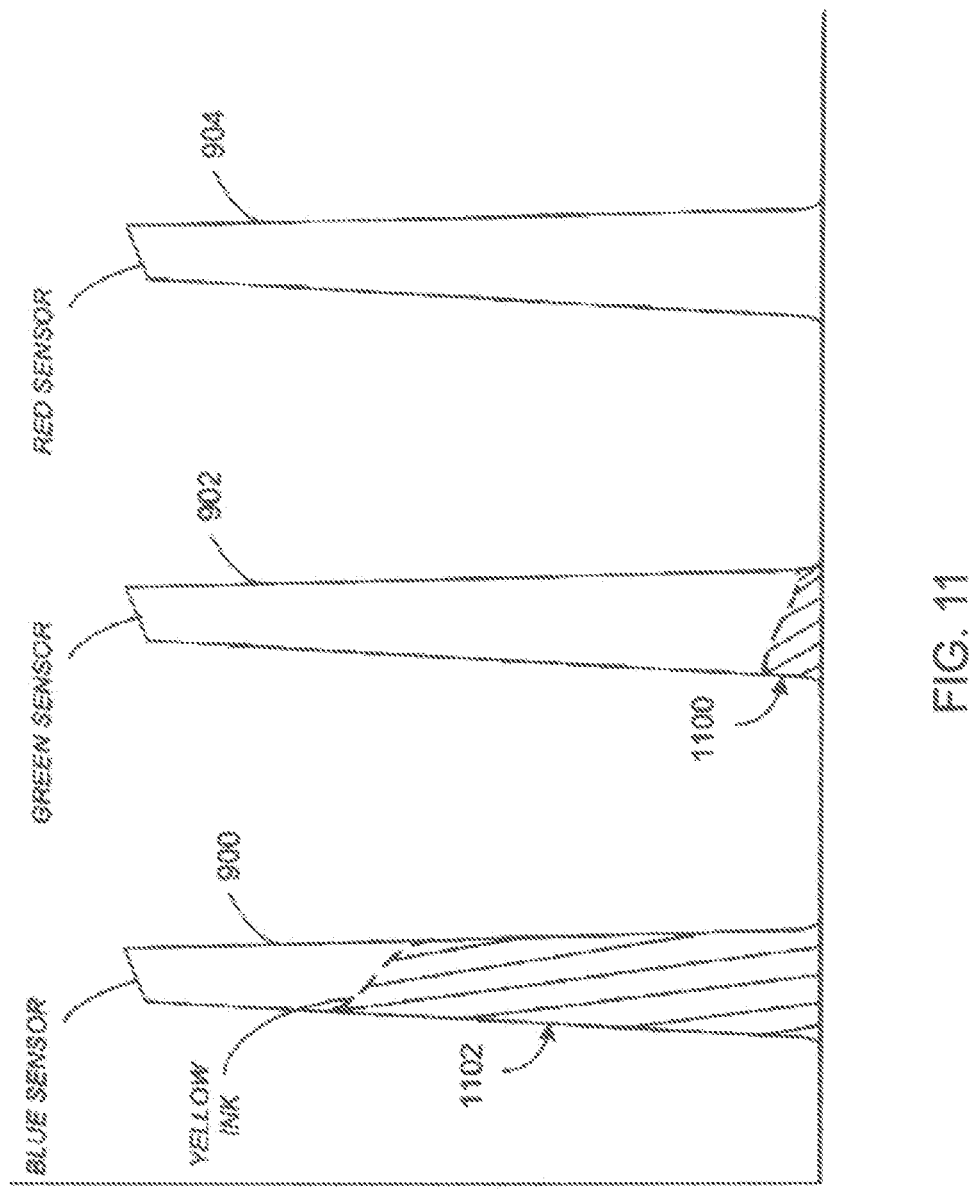

PRINTHEAD COLOR DENSITY CORRECTION IN PRINTING SYSTEMS

CROSS-REFERENCE TO RELATED APPLICATION

This patent application is related to U.S. patent application Ser. No. 13/747,552, entitled "PRINTHEAD COLOR DENSITY CORRECTION IN PRINTING SYSTEMS", filed concurrently herewith. This patent application is related to U.S. patent application Ser. Nos. 13/332,415 and 13/332,417, both filed on Dec. 21, 2011. This patent application is related to U.S. patent application Ser. Nos. 13/537,240 and 13/537,247, both filed on Jun. 29, 2012.

TECHNICAL FIELD

The present invention generally relates to printing systems and more particularly to methods for printhead color density correction in printing systems.

BACKGROUND

In commercial inkjet printing systems, the lineheads typically include multiple printheads that jet ink or another substance onto a print media, such as paper. Each printhead can include a nozzle plate having precisely sized and spaced nozzles. The diameter of each nozzle can range from five to twenty micrometers. Because multiple nozzle plates are used in many printing systems, the number of nozzles that are fabricated for each linehead can range between 12,000 to 30,000 nozzles.

It can be challenging to fabricate such small nozzles uniformly and consistently, along with the other linehead components associated with ink ejection. Failure to precisely fabricate the components within and between nozzle plates can lead to non-uniformities in the content printed by the printing system. The resulting variations in ink lay down characteristics can lead to unpredictable variations in dark and light density regions. The dark and light density regions continue until corrected, but the necessary corrections may not occur for hundreds or thousands of feet of print media. The non-uniformities in the printed content can result in waste when the printed content is not usable. Additionally, the wasted print media causes a print job to be more costly and time consuming.

SUMMARY

In one aspect of the invention, a printing system includes one or more lineheads for jetting ink or liquid onto a moving print media and an integrated imaging system that captures one or more images of at least one test block printed on the moving print media. The integrated imaging system includes a housing, an opening in the housing for receiving light reflected from the print media, a folded optical assembly in the housing that receives the reflected light and transmits the light a predetermined distance, and one or more image sensors within the housing that each receive the light and capture one or more images of the printed test block or blocks on the moving print media. The image sensor or sensors each include a color filter array having a known capture response. The color filter array or arrays can be complementary to the ink colors. The imaging system is connected to an image processing device. The image processing device receives pixel data from the one or more image sensors and is configured to determine a color of the ink and a density of the at least one printed test block.

In another aspect of the invention, a method for color density correction in a printing system is provided. A printing system includes a linehead that jets ink onto a moving print media and an integrated imaging system that captures images of content printed on the moving print media. The linehead includes one or more printheads and the integrated imaging system includes one or more image sensors having color filter arrays with known capture responses. The method includes producing one or more pixel data values and a measured density value trace for a printed test block by scanning the test block and averaging pixel data in a print media transport direction and determining a color and a density of the ink in the printed test block using the pixel data values. The measured density value trace is compared with a respective reference density value. A determination is made as to whether or not there is a difference between the measured density value trace and a reference density value. If there is a difference, adjusting ink laydown for the printhead based on the difference.

BRIEF DESCRIPTION OF THE DRAWINGS

Embodiments of the invention are better understood with reference to the following drawings. The elements of the drawings are not necessarily to scale relative to each other.

FIG. 5 is a cross-sectional view along line 5-5 in FIG. 4 in an embodiment in accordance with the invention;

FIG. 6 is a cross-sectional view along line 6-6 in FIG. 4 in an embodiment in accordance with the invention;

FIG. 11 illustrates the spectral response plot for the yellow ink shown in FIG. 9.

DETAILED DESCRIPTION

Figure 1:
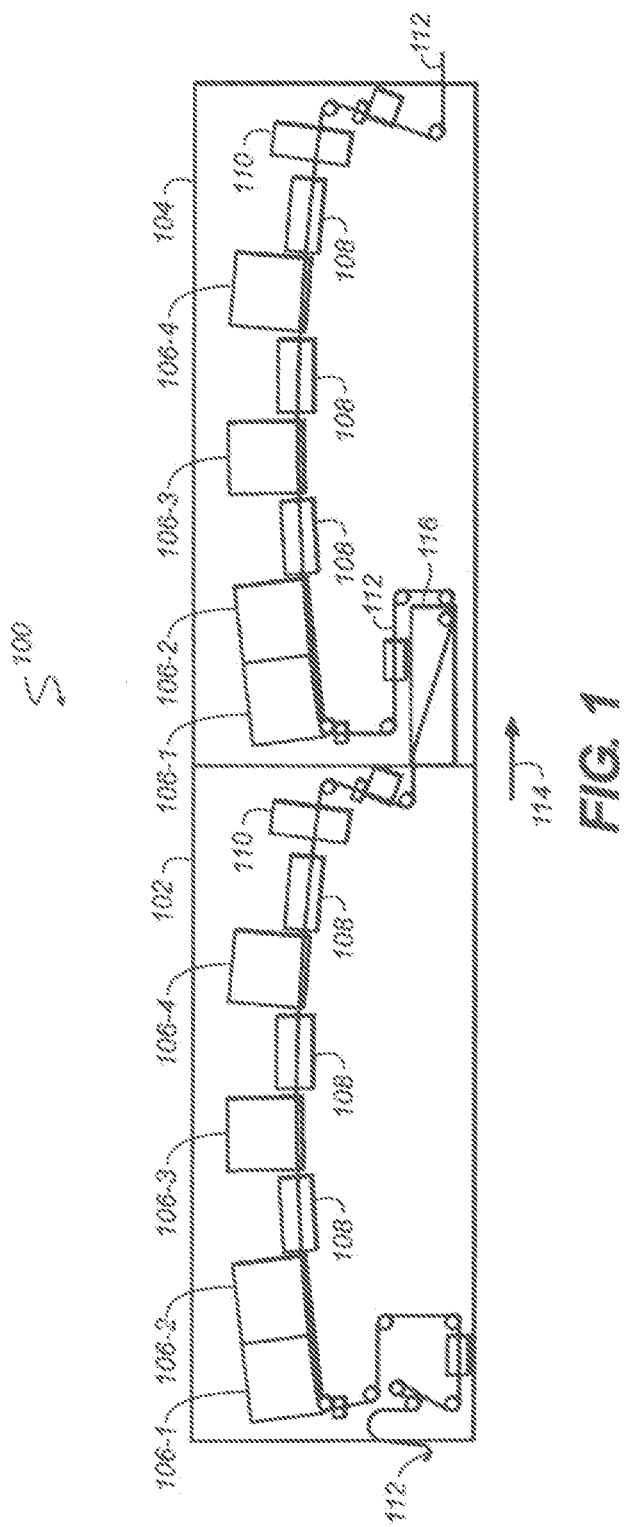
FIG. 1 illustrates one example of an inkjet printing system that prints on a continuous web of print media.

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on", "over", "top", "bottom", "left", "right" are used with reference to the orientation of the Figure(s) being described. Because components of embodiments of the present invention can be positioned in a number of different orientations, the directional terminology is used for purposes of illustration only and is in no way limiting.

The present description will be directed in particular to elements forming part of, or cooperating more directly with, an apparatus in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. As such, as described herein, the terms "liquid" and "ink" refer to any material that is ejected by the printhead or printhead components described below.

Inkjet printing is commonly used for printing on paper. However, there are numerous other materials in which inkjet is appropriate. For example, vinyl sheets, plastic sheets, textiles, paperboard, and corrugated cardboard can comprise the print media. Additionally, although the term inkjet is often used to describe the printing process, the term jetting is also appropriate wherever ink or other liquids is applied in a consistent, metered fashion, particularly if the desired result is a thin layer or coating.

Inkjet printing is a non-contact application of an ink to a print media. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting one of the print drops and the non-print drops and catching the non-print drops. Various approaches for selectively deflecting drops have been developed including electrostatic deflection, air deflection, and thermal deflection.

Additionally, there are typically two types of print media used with inkjet printing systems. The first type is commonly referred to as a continuous web while the second type is commonly referred to as a cut sheet(s). The continuous web of print media refers to a continuous strip of media, generally originating from a source roll. The continuous web of print media is moved relative to the inkjet printing system components via a web transport system, which typically include drive rollers, web guide rollers, and web tension sensors. Cut sheets refer to individual sheets of print media that are moved relative to the inkjet printing system components via rollers and drive wheels or via a conveyor belt system that is routed through the inkjet printing system.

The invention described herein is applicable to both types of printing technologies. As such, the terms printhead and linehead, as used herein, are intended to be generic and not specific to either technology. Additionally, the invention described herein is applicable to both types of print media. As such, the terms web and print media, as used herein, are intended to be generic and not as specific to either type of print media or the way in which the print media is moved through the printing system.

Figure 2:
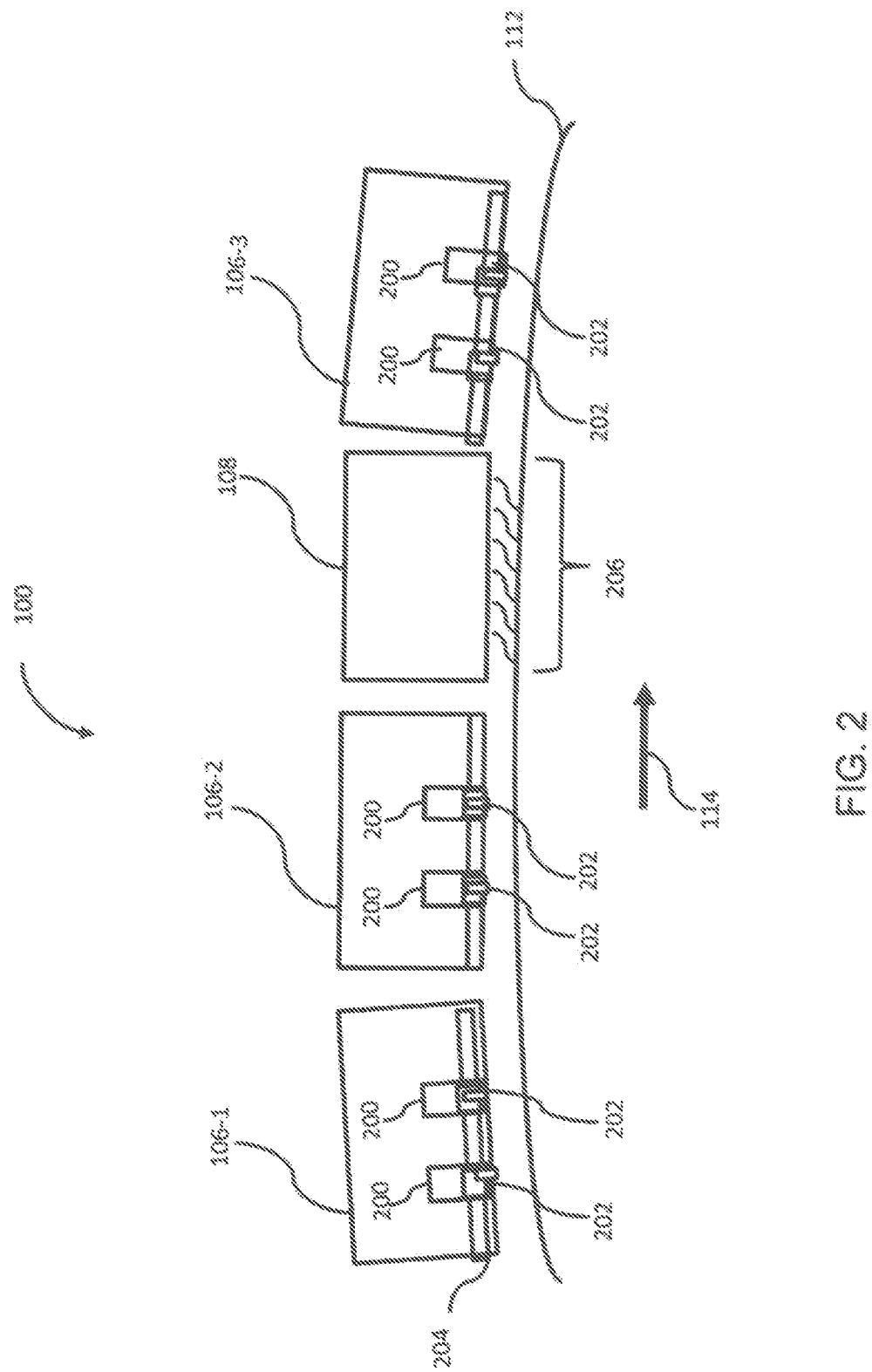
FIG. 2 depicts a portion of printing system 100 in more detail.
Figure 3:
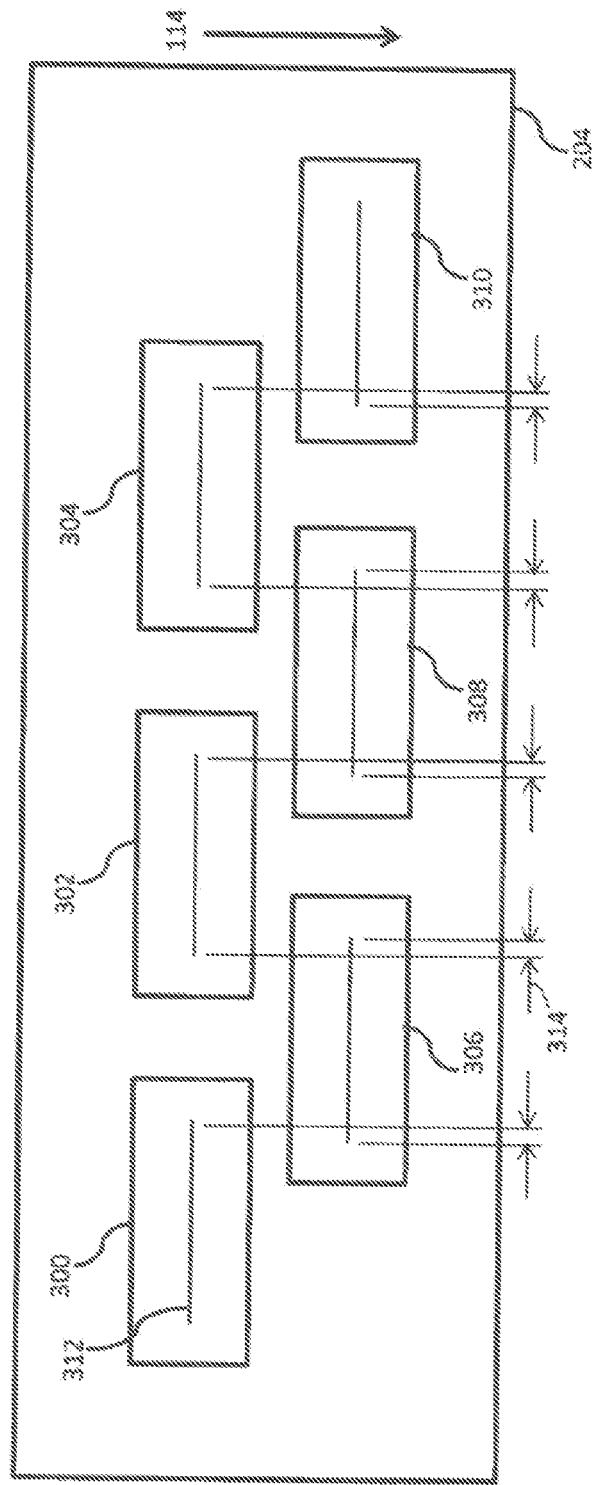
FIG. 3 illustrates a side of the support structure 204 that is opposite the print media 112 in an embodiment in accordance with the invention.

The terms "upstream" and "downstream" are terms of art referring to relative positions along the transport path of the print media; points on the print media move along the transport path from upstream to downstream. In FIGS. 1-3 the media moves in the direction indicated by transport direction arrow 114. Where they are used, terms such as "first", "second", and so on, do not necessarily denote any ordinal or priority relation, but are simply used to more clearly distinguish one element from another.

Referring now to the schematic side view of FIG. 1, there is shown one example of an inkjet printing system that prints on a continuous web of print media. Printing system 100 includes a first printing module 102 and a second printing module 104, each of which includes lineheads 106, dryers 108, and a quality control sensor 110. Each linehead 106 typically includes multiple printheads (shown in FIGS. 2 and 3) that apply ink or another liquid to the surface of the print media 112 that is adjacent to the printheads. For descriptive purposes only, the lineheads 106 are labeled a first linehead 106-1, a second linehead 106-2, a third linehead 106-3, and a fourth linehead 106-4. In the illustrated embodiment, each linehead 106-1, 106-2, 106-3, 106-4 applies a different colored ink to the surface of the print media 112 that is adjacent to the lineheads. By way of example only, linehead 106-1 applies cyan colored ink, linehead 106-2 magenta colored ink, linehead 106-3 yellow colored ink, and linehead 106-4 black colored ink.

The first printing module 102 and the second printing module 104 also include a web tension system that serves to physically move the print media 112 through the printing system 100 in the transport direction 114 (left to right as shown in the figure). The print media 112 enters the first printing module 102 from a source roll (not shown) and the linehead(s) 106 of the first module applies ink to one side of the print media 112. As the print media 112 feeds into the second printing module 104, a turnover module 116 is adapted to invert or turn over the print media 112 so that the linehead(s) 106 of the second printing module 104 can apply ink to the other side of the print media 112. The print media 112 then exits the second printing module 104 and is collected by a print media receiving unit (not shown).

Although FIG. 1 depicts each printing module with four lineheads 106, three dryers 108, and one quality control sensor 110, embodiments in accordance with the invention are not limited to this construction. A printing system can include any number of lineheads, any number of dryers, and any number of quality control sensors. The printing system can also include a number of other components, including, but not limited to, web cleaners and web tension sensors.

And although the printing system shown in FIG. 1 has the turnover module 116 disposed in the second printing module 104, other printing systems can include the turnover module within the first printing module 102 or between the printing modules.

FIG. 2 illustrates a portion of printing system 100 in more detail. As the print media 112 is directed through printing system 100, the lineheads 106, which typically include a plurality of printheads 200, apply ink or another liquid onto the print media 112 via the nozzle arrays 202 of the printheads 200. The printheads 200 within each linehead 106 are located and aligned by a support structure 204 in the illustrated embodiment. After the ink is jetted onto the print media 112, the print media 112 passes beneath the one or more dryers 108 which, for example, apply heat 206 to the ink on the print media or provide a flow of air past the ink on the print media.

Referring now to FIG. 3, there is shown a side of the support structure 204 that is adjacent to the print media 112 in an embodiment in accordance with the invention. The printheads 300, 302, 304, 306, 308, 310 are aligned in a staggered formation, with upstream printheads 300, 302, 304 and downstream printheads 306, 308, 310, such that the nozzle arrays 312 produce overlap regions 314. The overlap regions 314 enable the print from overlapped printheads to be stitched together without a visible seam through the use of appropriate stitching algorithms that are known in the art. These stitching algorithms ensure that the amount of ink printed in an overlap region 314 is not higher or lower than the ink on other portions of the print media.

Figure 4:
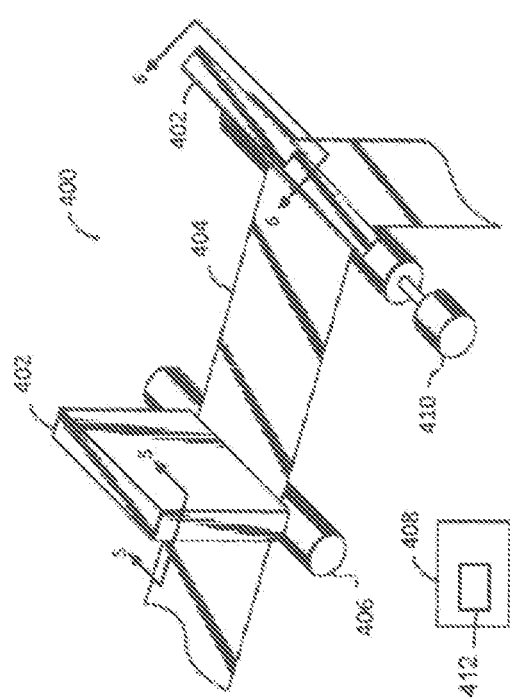
FIG. 4 depicts a portion of a printing system in an embodiment in accordance with the invention.

FIG. 4 depicts a portion of a printing system in an embodiment in accordance with the invention. Printing system 400 includes one or more integrated imaging systems 402 disposed over the print media 404. Although FIG. 4 illustrates only one integrated imaging system positioned across the width (cross-track direction) of the print media, embodiments in accordance with the invention can dispose any number of integrated imaging systems across the width of the print media 404.

The integrated imaging systems 402 are disposed over the print media 404 at locations in printing system 400 where the print media 404 is transported over rollers 406 in an embodiment in accordance with the invention. The print media can be more stable, both in the cross-track and in-track (media transport) directions, when moving over the rollers 406. In other embodiments in accordance with the invention, one or more integrated imaging systems can be positioned at any location in a printing system.

The integrated imaging systems 402 are connected to an image processing device 408. The image processing device 408 is adapted to process pixel data received from the integrated imaging systems 402 and identify ink colors and detect density variations in content printed on the print media 404 in an embodiment in accordance with the invention. The integrated imaging system or systems 402 can be connected to and transmit data to the image processing device 408 through any known wired or wireless connection. Image processing device 408 can be external to printing system 400; integrated within printing system 400; or integrated within a component in printing system 400. The image processing device 408 can be implemented with one or more processing devices, such as a computer or a programmable logic circuit.

Motion encoder 410 can be used to produce an electronic pulse or signal proportional to a fixed amount of incremental motion of the print media in the feed direction. The signal from motion encoder 410 is used to trigger an image sensor (see 506 in FIG. 5) to begin capturing an image of the printed content on the moving print media using the light reflected off the print media.

Connected to the image processing device 408 is memory storage device 412. The storage device 412 can store reference density values, for example, included in a series of look up tables (LUTs), and pixel data values used to identify density values and ink colors in an embodiment in accordance with the invention. The storage device 412 can be implemented as one or more external storage devices; one or more storage devices included within the image processing device 408; or a combination thereof.

FIG. 5 is a cross-sectional view along line 5-5 in FIG. 4 in an embodiment in accordance with the invention. Integrated imaging system 402 includes light source 500, transparent cover 502, folded optical assembly 504, and image sensor 506 all enclosed within housing 510. In the illustrated embodiment, folded optical assembly 504 includes mirrors 512, 514 and lens 516. Mirrors 512, 514 can be implemented with any type of optical elements that reflects light in embodiments in accordance with the invention.

Light source 500 transmits light through transparent cover 502 and towards the surface of the print media (not shown). The light source can comprise a broad spectrum light source such as an incandescent light or fluorescent light, or can comprise light sources that emit light in one or more narrow bands such as LEDs, lasers or gas discharge light sources. If the light source comprises light sources having a narrow wavelength emission spectrum, multiple narrow band light sources can be used, having different narrow wavelength emission spectra to cover different portions of the spectra. For example the light source 500 may comprise a set of different color LEDs. Although not shown in FIG. 6, the light source can be extended in length to span the width of the print media so that uniform illumination is provided across the width of the print media. The light reflects off the surface of the print media and propagates through the transparent cover 502 and along the folded optical assembly 504, where mirror 512 directs the light towards mirror 514, and mirror 514 directs the light toward lens 516. The light is focused by lens 516 to form an image on image sensor 506. Image sensor 506 captures one or more images of the print media as the print media moves through the printing system by converting the reflected light into electrical signals.

Folded optical assembly 504 bends or directs the light as it is transmitted to image sensor 506 such that the optical path traveled by the light is longer than the size of integrated imaging system 402. Folded optical assembly 504 allows the imaging system 402 to be constructed more compactly, reducing the weight, dimensions, and cost of the imaging system. Folded optical assembly 504 can be constructed differently in other embodiments in accordance with the invention. Additional or different optical elements can be included in folded optical assembly 504.

As discussed earlier, image sensor 506 can receive a signal from a motion encoder (e.g., 410 in FIG. 4) each time an incremental motion of the print media occurs in the feed direction. The signal from the motion encoder is used to trigger image sensor 506 to begin integrating the light reflected from the print media. In the case of a linear image sensor, the unit of incremental motion is typically configured such that an integration period begins with sufficient frequency to sample or image the print media in the feed direction with the same resolution as is produced in the cross-track direction. If the trigger occurs at a rate which produces a rate that results in sampling in the in-track (feed) direction at a higher rate, an image that is over sampled in that direction is produced and the imaged content appears elongated or stretched in the in-track direction. Conversely, a rate that is lower for the in-track direction produces imaged content that is compressed in the in-track direction.

The time period over which the integration occurs determines how much print media moves through the field of view of the imaging system. With shorter integration periods such as a millisecond or less, the motion of the print media can be minimized so that fine details in the in-track direction can be imaged. When longer integration periods are used, the light reflected off the print media is collected while the print media is moving and the motion of the print media means the printed content is blurred in the direction of motion. The blurring in the direction of motion has the effect of averaging the pixel data in one direction, the in-track (feed) direction. Averaging the pixel data through blurring is also known as optical averaging. By performing the averaging optically with longer integration periods, the amount of data that is transferred to and processed by a processing device (e.g., 408 in FIG. 4) is reduced. Blurring reduces image resolution in the in-track direction, and is therefore generally avoided for applications that require the identification of artifacts that are small and occur randomly.

The amount of optical averaging can be increased by reducing the frequency of the pulses from the motion encoder (e.g., 410 in FIG. 4) and extending the integration time of the image sensor (e.g., 506 in FIG. 5) in the imaging system (e.g., 402 in FIG. 5). Reducing the frequency of the pulses has the benefit of reducing the amount of data transferred to the image processing device and of reducing the numerical averaging performed by the image processing device (e.g., 408 in FIG. 4). The integration time should be less than the period between image capture events. Additional numerical averaging or other image processing of the pixel data in the in-track direction can be computed by the processing device on images captured by the image sensor. The amount of optical image averaging can be decreased with an increase in the numerical averaging required. The ability to use optical averaging not only significantly reduces the camera hardware cost, but also its footprint size.

In another embodiment in accordance with the invention, averaging of the pixel data in one direction can be performed by a processing device (e.g., 408 in FIG. 4) using multiple images captured by the image sensor. The images can be captured with shorter integration times in an embodiment in accordance with the invention. The processing device numerically averages the pixel data in one direction, the in-track direction, to produce blurring in an image or images. The processing device can also perform other types of imaging processing procedures in addition to the numerical averaging of the pixel data.

Returning to FIG. 5, the transparent cover 502 is disposed over an opening 501 in the housing 510. Transparent cover 502 is optional and can be omitted in other embodiments in accordance with the invention. Integrated imaging system 402 can also include vent openings 518, 520. Vent opening 518 can be used to input air or gas while vent opening 520 can be used to output exhaust. The input air or gas can be used to maintain a clean environment and control the temperature within integrated imaging system 402. In another embodiment in accordance with the invention, integrated imaging system 402 can include one or more vent openings (e.g., vent opening 518) that input air or gas and the opening 501 in the housing 510 is used to output exhaust. The output opening can be positioned such that it directs clean dry air across the exterior face of the transparent cover 502 to ensure that the exterior face of the transparent cover 502 remains clean and dry. In embodiment in which the opening 501 doesn't include a transparent cover 502, the input gas or air can flow out through the opening 501 to prevent the flow of moisture of dirt into the housing where they can contaminate the optical components.

FIG. 6 is a cross-sectional view along line 6-6 in FIG. 4 in an embodiment in accordance with the invention. As described, light source 500 transmits light through transparent cover 502 and towards the surface of the print media (not shown). The light reflects off the surface of the print media, propagates along folded optical assembly, and is directed toward lens 516. Lens 516 focuses the light to form an image on image sensor 506. Light source 500 can remain on or can be strobed at a rate appropriate for the integration time of the image sensor 506. Image sensor 506 can be implemented with any type of image sensor, including, but not limited to, one or more linear image sensors constructed as a charge-coupled device (CCD) image sensor or a complementary metal oxide semiconductor (CMOS) image sensor. The images of the print media formed on the image sensor 506 are converted to a digital representation that is suitable for analysis in a computer or image processing device, such as image processing device 408.

Figure 7:
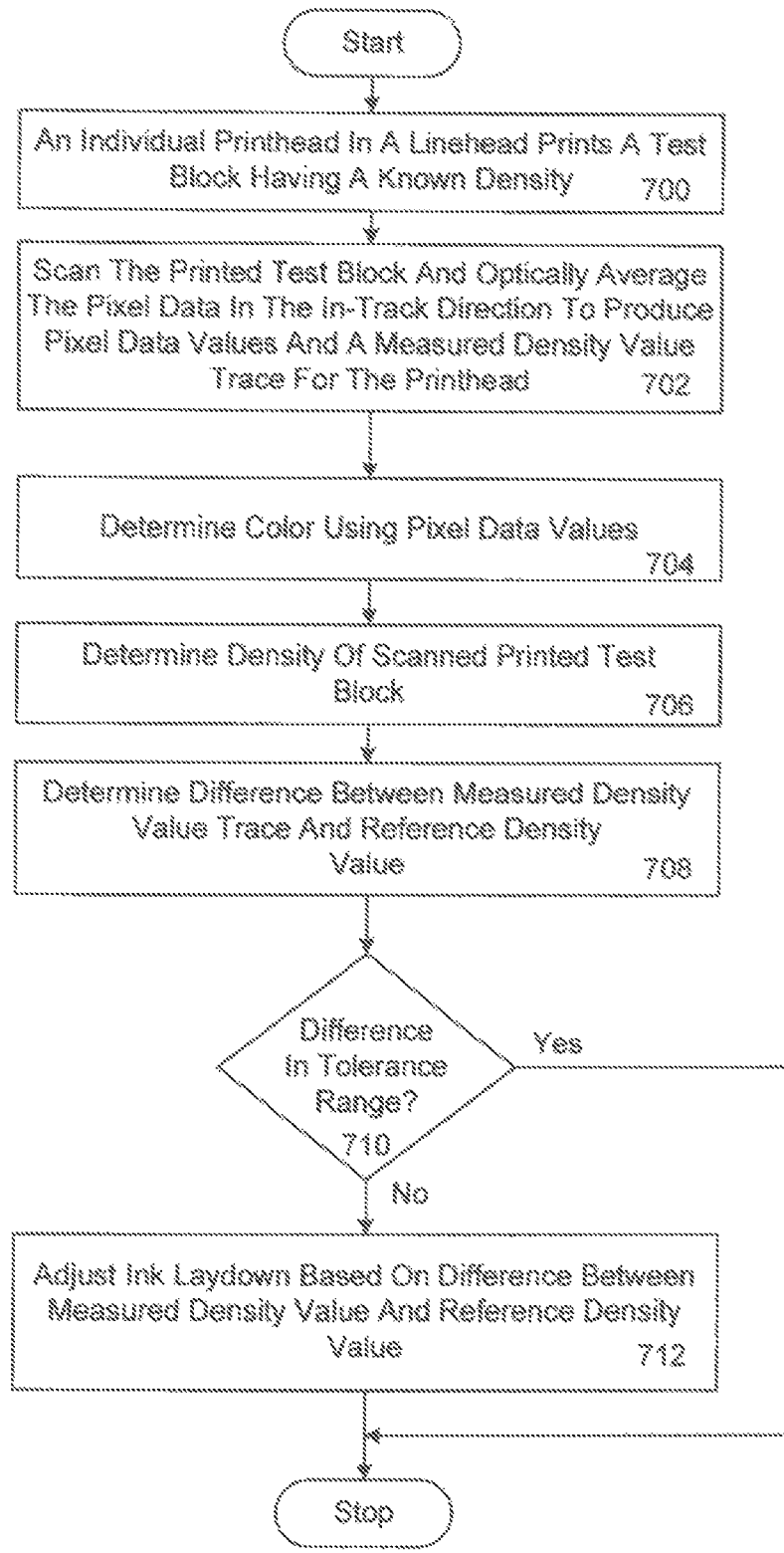
FIG. 7 is a flowchart of a method for printhead color density correction in a printing system in an embodiment in accordance with the invention.

Referring now to FIG. 7, there is shown a flowchart of a method for color density correction in a printing system in an embodiment in accordance with the invention. As described earlier, variations in ink lay down characteristics between printheads can lead to unpredictable variations in dark and light density regions. The method of FIG. 7 is described in conjunction with one printhead in a linehead, but those skilled in the art will recognize the method can be used continuously or at select times with one or more printheads in one or more lineheads.

Figure 8:
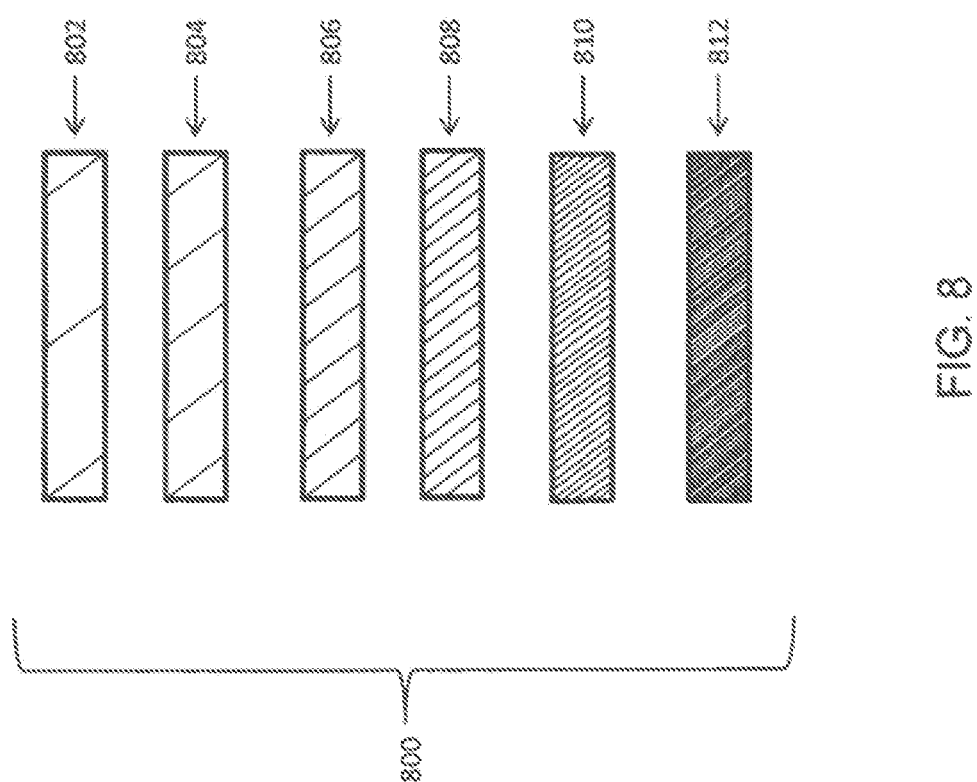
FIG. 8 depicts an example of a test block pattern in an embodiment in accordance with the invention.

Initially, a printhead in a linehead prints a test block having a known or fixed print density on a print media (block 700). The test block can include any given content having a known print density. The test block can be included in a test block pattern in an embodiment in accordance with the invention. FIG. 8 illustrates one example of a test block pattern 800. The test block pattern 800 includes multiple test blocks 802, 804, 806, 808, 810, 812. In the illustrated embodiment, each test block has a known density that is different from the density of the other test blocks in the test block pattern. By way of example only, test block 802 can have a density of 0.2, test block 804 a density of 0.4, test block 806 a density of 0.6, test block 808 a density of 0.8, test block 810 a density of 1.0, and test block 812 a density of 1.2.

Other embodiments in accordance with the invention can include any number of test blocks in a test block pattern. If a test block pattern has two or more test blocks, at least two of the test blocks can have differing known densities.

Returning to block 702 in FIG. 7, the printed test block is scanned and the pixel data averaged in the in-track direction to produce pixel data values for the printed test block and a measured density value trace for the printhead. As used herein, the term trace can be a graph of the measured density value data points or a non-graphed array of the measured density value data points. In some embodiments, the storage device 412 stores measured density value data, for example, in a series of look up tables (LUTs). The pixel data is optically averaged in the illustrated embodiment. The pixel data can be numerically averaged in another embodiment in accordance with the invention.

The color of the ink or substance that was printed on the print media is then identified at block 704 using the pixel data values obtained from scanning the printed text block. In one embodiment in accordance with the invention, three linear image sensors are used to scan the test block. The image sensors have different color filter arrays disposed over the photosensitive sites. A color array includes color filter elements that each transmits light propagating within a known wavelength range. The color filter elements block or absorb light propagating outside the known wavelength range. Thus, the photosensitive sites in the linear image sensor detect light propagating within the known wavelength range. The wavelength sensitivities of the color filter arrays are selected to be complementary colors to the colors in the ink in an embodiment in accordance with the invention.

For example, in a printing system that uses cyan, magenta, and yellow colored inks, one linear image sensor can include a red color filter array, one linear image sensor a blue color filter array, and the third image sensor a green color filter array. The photosensitive sites in the linear image sensor with the red color filter array detect light propagating within the wavelength range associated with the color red. The photosensitive sites in the linear image sensor with the blue color filter array detect light propagating within the wavelength range associated with the color blue. And the photosensitive sites in the linear image sensor with the green color filter array detect light propagating within the wavelength range associated with the color green.

The linear image sensors each produce pixel data values representing the amount of light detected by the photosensitive sites. Thus, in the example embodiment that uses three image sensors for the cyan, magenta, and yellow colored inks, three pixel data values are produced for each test block in an embodiment in accordance with the invention. Other embodiments in accordance can include a different number of image sensors or a different number of ink colors.

Figure 9:
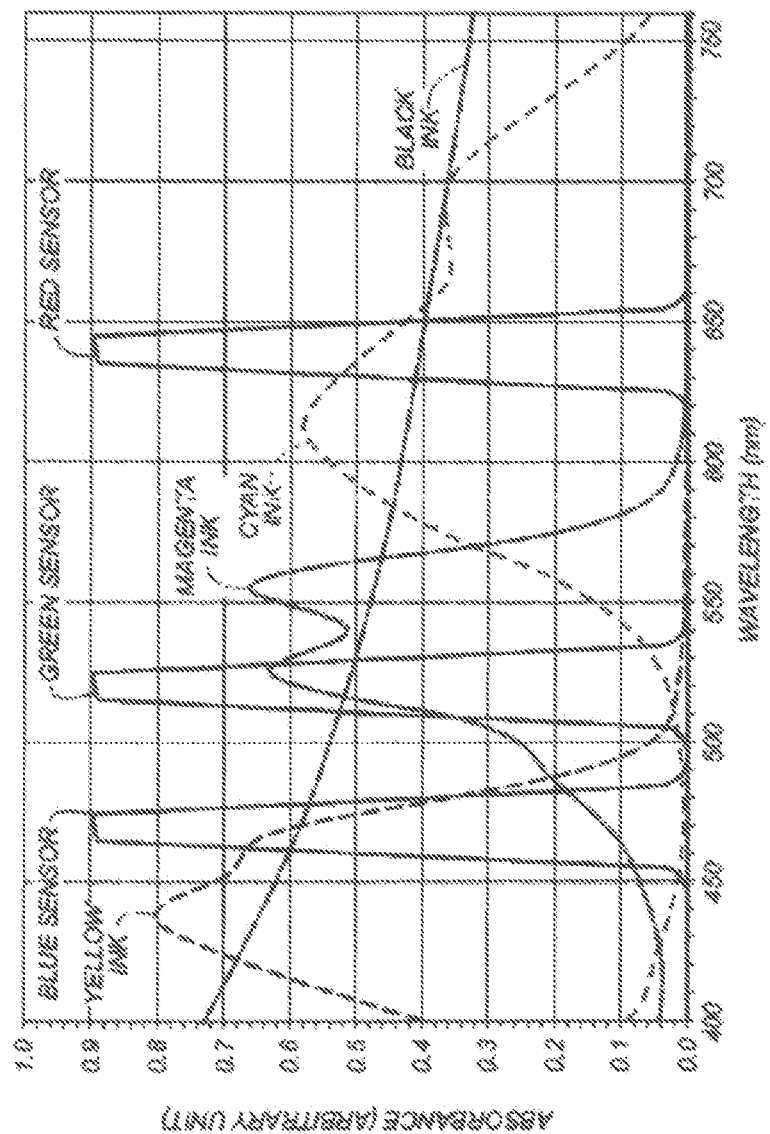
FIG. 9 illustrates an example of a spectral response plot in an embodiment in accordance with the invention.
Figure 10:
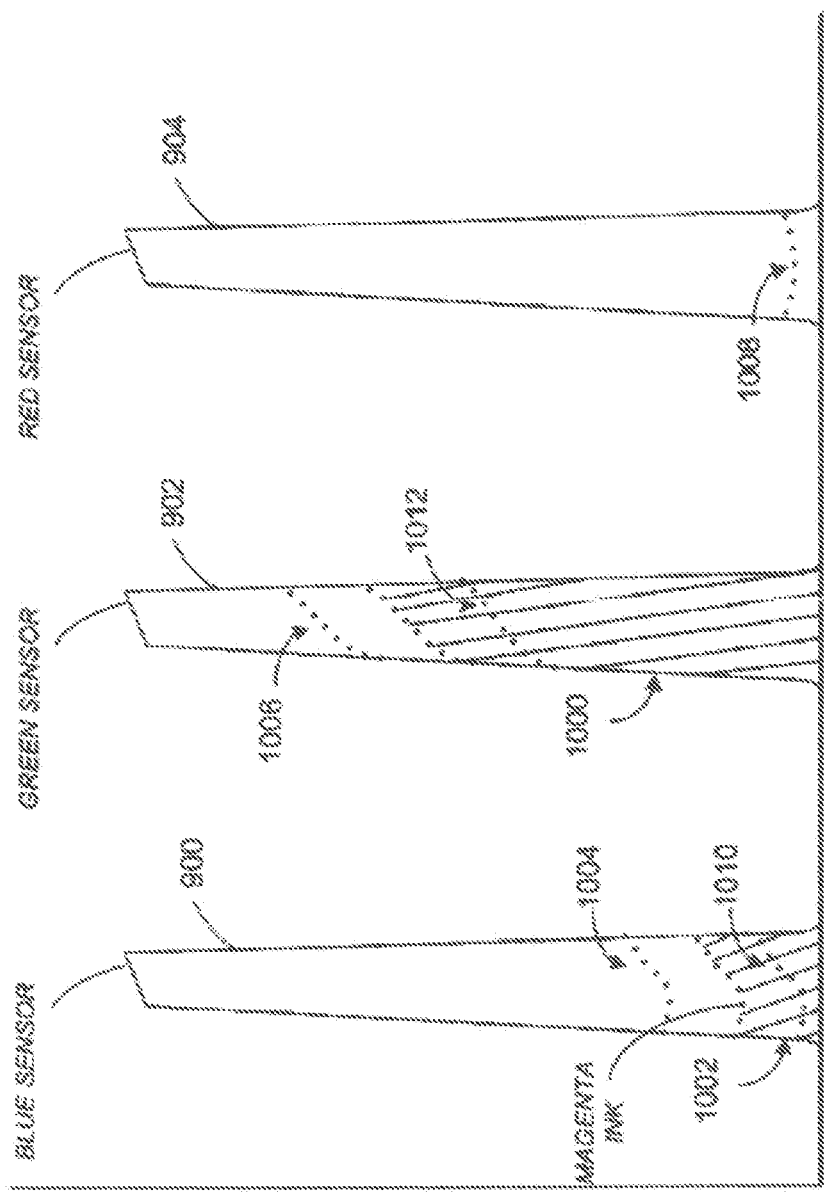
FIG. 10 depicts the spectral response plot for the magenta ink shown in FIG. 9.

The three pixel data values are used to determine the color of the printed test block. FIGS. 9-11 illustrate one method for identifying a color. FIG. 9 depicts an example of a spectral response plot in an embodiment in accordance with the invention. In FIGS. 10 and 11, plot 900 represents the spectral response capture cross section of the image sensor having a blue color filter array, plot 902 the spectral response capture cross section region of the image sensor having a green image sensor, and plot 904 the spectral response capture cross section region of the image sensor having a red color filter array. The absorbance spectral response values are plotted for a yellow ink, a magenta ink, a cyan ink, and a black ink. The intersection of the capture cross section plots and the colored ink absorbance plots are used to identify the color and color density of the scanned test blocks. The capture cross sections illustrated in FIGS. 9-11 represent the capture response of the image sensors (e.g., the total amount of light the image sensors can sense).

For example, in FIGS. 9 and 10, the area under the magenta ink absorbance spectral response that overlaps with the capture cross section of the image sensor with the green color filter array (plot 902) is a measure of the amount of light captured by this sensor from a scanned color block. The overlapped area is shown as the hashed area 1000 in FIG. 10. In this example, the capture value for the magenta ink that is represented by the hashed area 1000 is output from the image sensor having the green color filter array.

A smaller overlap area (hashed area 1002) between the magenta ink absorbance response and the capture cross section (plot 900) of the image sensor with the blue color filter array is shown in FIG. 10. In this example, the capture value for the magenta ink output from the image sensor with the blue color filter array would be relatively low.

Finally, there is no overlap between the magenta ink absorbance spectral response with the capture cross section of the image sensor having the red color filter array (plot 904). Hence the capture value for the magenta ink from the image sensor with the red color filter array is substantially zero. The ratio of the three capture values for a test block having a given ink color can be used to identify the color. The absolute capture values output from the three image sensors for a test block can be used to determine the density of the color block. This is one example of a technique for using only three image sensors in an imaging device to determine both the color and the color density of a fixed color block.

Similarly, the area under the yellow ink absorbance spectral response that overlaps with the capture cross section of the green color filter array sensor (plot 902) is a measure of the amount of light captured by this sensor from a scanned color block. The overlapped area is shown as the hashed area 1100 in FIG. 11. In this example, the capture value for the yellow ink that is represented by the hashed area 1100 is output from the image sensor having the green color filter array.

A larger overlap area (hashed area 1102) between the yellow ink absorbance response with the capture cross section (900) of the image sensor with the blue color filter array is shown in FIG. 11. In this example, the capture value for the magenta ink output from the image sensor with the blue color filter array would be relatively higher than the capture value produced by the image sensor with the green color filter array. Finally, there is no overlap between the magenta ink response with the red sensor (904). Hence the captured value for the magenta ink from the image sensor with the red color filter array is substantially zero. The ratio of these the capture values for a test block having a given ink color can be used to identify the color. The absolute capture values output from the three image sensors for a test block can be used to determine the density of the color block. This is one example of a technique for using only three image sensors in an imaging device to determine both the color and the color density of a fixed color block.

If the individual test blocks of the test pattern 800 are each printed with a single ink, the analysis of the ratio of these the capture values for a test block having a given ink color can be used to confirm that the printed ink has a similar absorption spectra to the ink intended for printing the test block. This can be used to confirm whether the printed ink is approved for use in the printer or whether it may be a non-approved ink that could adversely affect the operation of the printheads. Should a non-approved ink be detected, the printing system may notify the operator that non-approved ink may invalidate the warranty of the printheads or fluid system.

Typically, the absorbance spectral response for a test block increases when the density of the test block increases. An increase in the color density produces an overlap between the absorbance spectral response and the capture cross section of an image sensor that is greater. The increase in the absorbance spectral response is shown with spectral responses 1004, 1006, and 1008 in FIG. 10.

The absorbance spectral response for a test block decreases when the density of the test block decreases. An increase in the color density produces an overlap between the absorbance spectral response and the capture cross section of an image sensor that is smaller. The decrease in the absorbance spectral response is shown with spectral responses 1010 and 1012 in FIG. 10. Thus, changes in the absorbance spectral responses correspond to changes in the density of the test blocks.

Returning to block 706 in FIG. 7, the density of the scanned test block is determined using the pixel data values obtained from scanning the test block. The absorption values for each ink color depend on the color density of the test block. As the color density of the test block increases, the absorption values increase. And as the color density of the test block decreases, the absorption values decrease.

Figure 12:
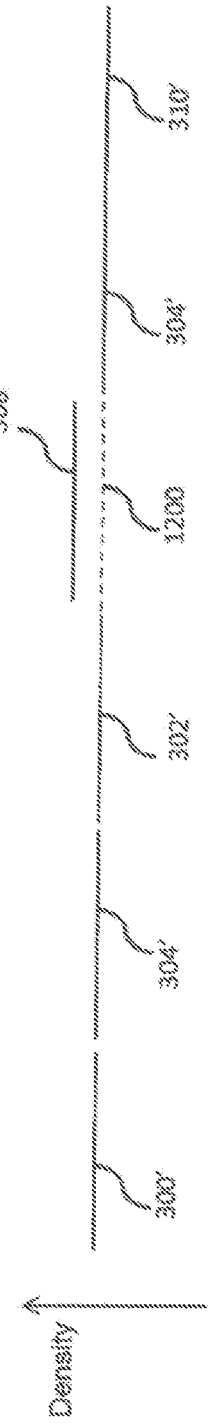
FIG. 12 depicts one example of density value traces for the printheads shown in FIG. 3 in an embodiment in accordance with the invention.

Next, as shown in block 708, the measured density value trace is compared with a reference density value trace. By way of example only, reference density values can be independently supplied by a printing system manufacturer or customized or set by the user of the printing system. FIG. 12 illustrates one example of density value traces for the printheads shown in FIG. 3 in an embodiment in accordance with the invention. Trace 300' corresponds to printhead 300, trace 302' to printhead 302, trace 304' to printhead 304, trace 306' to printhead 306, trace 308' to printhead 308, and trace 310' to printhead 310. The reference density value is represented by plot 1200.

A determination is made at block 710 of FIG. 7 as to whether or not a difference between the measured density value trace and the reference density value equals or exceeds a threshold value. If the difference equals or exceeds the threshold value, the ink laydown for the printhead is adjusted at block 712 based on the difference between the measured density value trace and the reference density value. For example, as shown in FIG. 10, the measured density value trace 308' is greater than the reference density value 1200. If the difference equals or exceeds a threshold value, the ink laydown for printhead 308 is adjusted based on the difference. Examples of techniques that can be used to adjust the ink laydown include, but are not limited to, changing the size of the ink drops jetted by the printhead, by changing the ink pressure, or by altering the halftoning algorithm to change the number of ink drops jetted by the printhead. One change or a combination of changes can be implemented to adjust the ink laydown. The change (or changes) produces a printed density that is the same, or substantially the same as the reference density value.

Embodiments in accordance with the invention can perform the method shown in FIG. 7 one or more times. For example, the method of FIG. 7 can be performed each day prior to beginning any print jobs to calibrate the printing system; or the method of FIG. 7 can be performed during a print job to monitor and correct for any flat field errors that develop during the print job.

Embodiments in accordance with the invention can perform the method shown in FIG. 7 differently or can include additional functions or processes. Additionally, some of the blocks can be omitted in other embodiments in accordance with the invention. By way of example only, block 710 can be omitted.

The invention has been described in detail with particular reference to certain preferred embodiments thereof, but it will be understood that variations and modifications can be effected within the spirit and scope of the invention. And even though specific embodiments of the invention have been described herein, it should be noted that the application is not limited to these embodiments. In particular, any features described with respect to one embodiment may also be used in other embodiments, where compatible. And the features of the different embodiments can be exchanged, where compatible.

PARTS LIST 100 printing system
102 printing module
104 printing module
106 linehead
108 dryer
110 quality control sensor
112 print media
114 transport direction
116 turnover module
200 printhead
202 nozzle array
204 support structure
206 heat or air
300 printhead
300' measured density value trace for printhead 300
302 printhead
302' measured density value trace for printhead 300
304 printhead
304' measured density value trace for printhead 300
306 printhead
306' measured density value trace for printhead 300
308 printhead
308' measured density value trace for printhead 300
310 printhead
310' measured density value trace for printhead 300
314 overlap region
400 printing system
402 integrated imaging system
404 print media
406 roller
408 image processing device
410 motion encoder
412 storage device
500 light source
501 opening in housing
502 transparent cover
504 folded optical assembly
506 image sensor
510 housing
512 mirror
514 mirror
516 lens
518 vent
520 vent
800 test block pattern
802 test block
804 test block
806 test block
808 test block
810 test block
812 test block
900 plot of spectral response region
902 plot of spectral response region
904 plot of spectral response region
1000 overlap area
1002 overlap area
1004 absorbance spectral response of test block with increased density
1006 absorbance spectral response of test block with increased density
1008 absorbance spectral response of test block with increased density
1010 absorbance spectral response of test block with decreased density 1012 absorbance spectral response of test block with decreased density
1100 overlap area
1102 overlap area
1200 reference density value

The invention claimed is:

1. A printing system, comprising:
a linehead that jets ink onto a moving print media to print a test block;
an integrated imaging system positioned downstream of the linehead with respect to a media transport direction, wherein the integrated imaging system comprises:
a housing;
an opening in the housing for receiving light reflected from a moving print media;
a folded optical assembly in the housing that receives the reflected light and transmits the light a predetermined distance; and
one or more image sensors within the housing that each receive the light and capture one or more images of the printed test block, wherein the one or more image sensors have known color filter arrays; and
an image processing device connected to the integrated imaging system for receiving pixel data from the one or more image sensors and configured to determine a color of the ink and a density of the printed test block using the pixel data.

2. The printing system as in claim 1, wherein the integrated imaging system includes at least two vent openings in the housing, one vent opening for inputting tempered air and one vent opening for outputting exhaust.

3. The printing system as in claim 1, wherein the integrated imaging system includes a light source for emitting light towards the print media.

4. The printing system as in claim 1, wherein the folded optical assembly comprises:
a lens; and
at least one mirror for directing the reflected light to the lens.

5. The printing system as in claim 1, further comprising a transparent cover over the opening in the housing.

6. The printing system as in claim 1, wherein the integrated imaging system includes a vent opening in the housing for receiving air or gas.

7. The printing system as in claim 6, wherein the vent opening in the housing is used to output exhaust.

8. The printing system as in claim 1, further comprising a roller for transporting the print media through the printing system.

9. The printing system of claim 8, further comprising a motion encoder connected to the roller, wherein the motion encoder is adapted to output a signal proportional to a fixed amount of incremental motion of the print media.

10. The printing system as in claim 8, wherein the integrated imaging system is disposed over the print media at a location where the print media is transported over the roller.

* * * * *